Jan. 3, 1928.　　　　　1,655,141
J. T. FAGAN ET AL
STEM MAKING MACHINE
Filed Oct. 9, 1923　　7 Sheets-Sheet 3
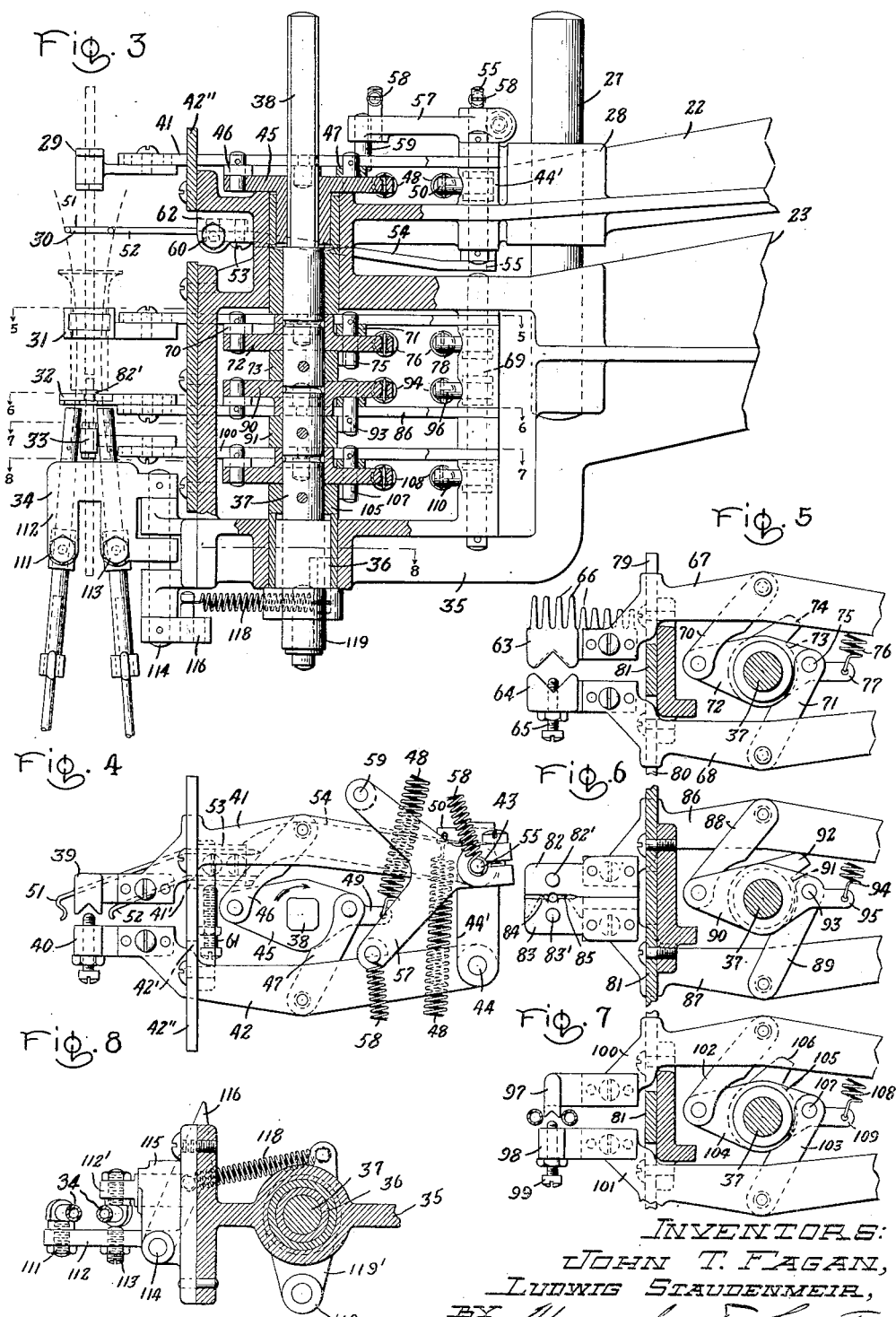
INVENTORS:
JOHN T. FAGAN,
LUDWIG STAUDENMEIR,
BY
THEIR ATTORNEY.

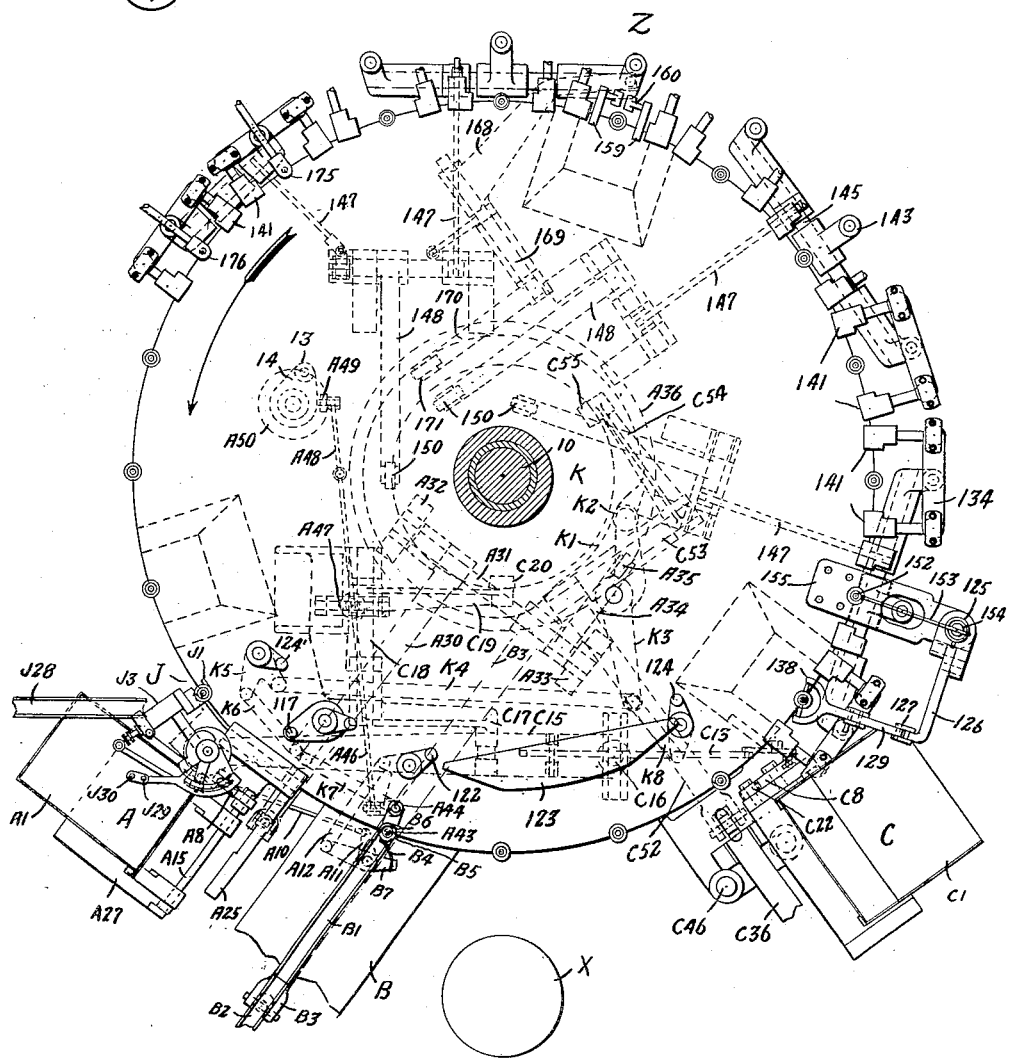

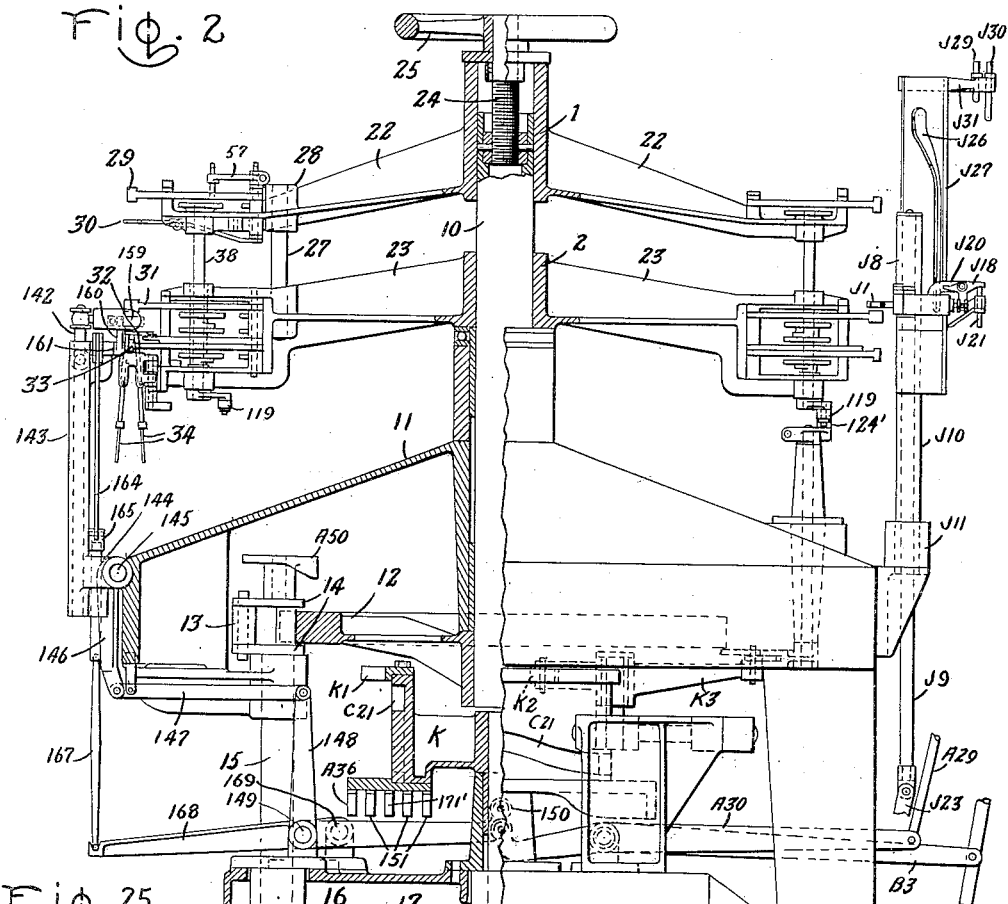

Jan. 3, 1928. 1,655,141

J. T. FAGAN ET AL

STEM MAKING MACHINE

Filed Oct. 9, 1923 7 Sheets-Sheet 4

INVENTORS:
JOHN T. FAGAN,
LUDWIG STAUDENMEIR,
BY
THEIR ATTORNEY.

Jan. 3, 1928.
J. T. FAGAN ET AL
1,655,141
STEM MAKING MACHINE
Filed Oct. 9, 1923
7 Sheets-Sheet 5
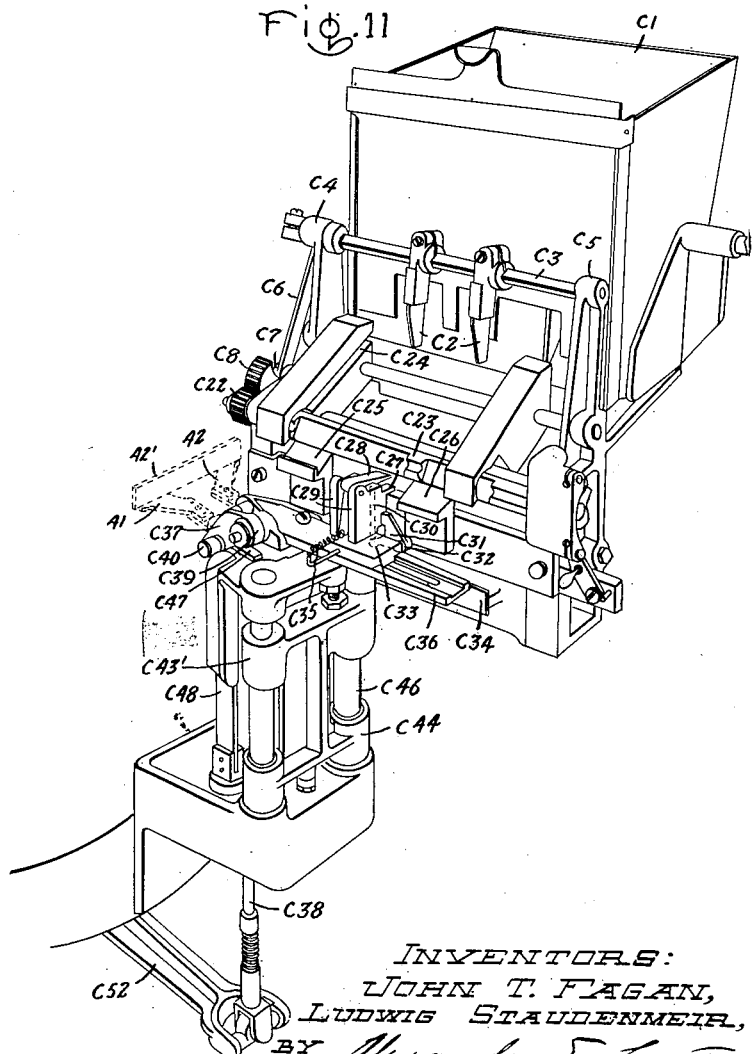
INVENTORS:
JOHN T. FAGAN,
LUDWIG STAUDENMEIR,
BY
THEIR ATTORNEY.

Jan. 3, 1928.
J. T. FAGAN ET AL
1,655,141
STEM MAKING MACHINE
Filed Oct. 9, 1923
7 Sheets-Sheet 6
Fig. 23
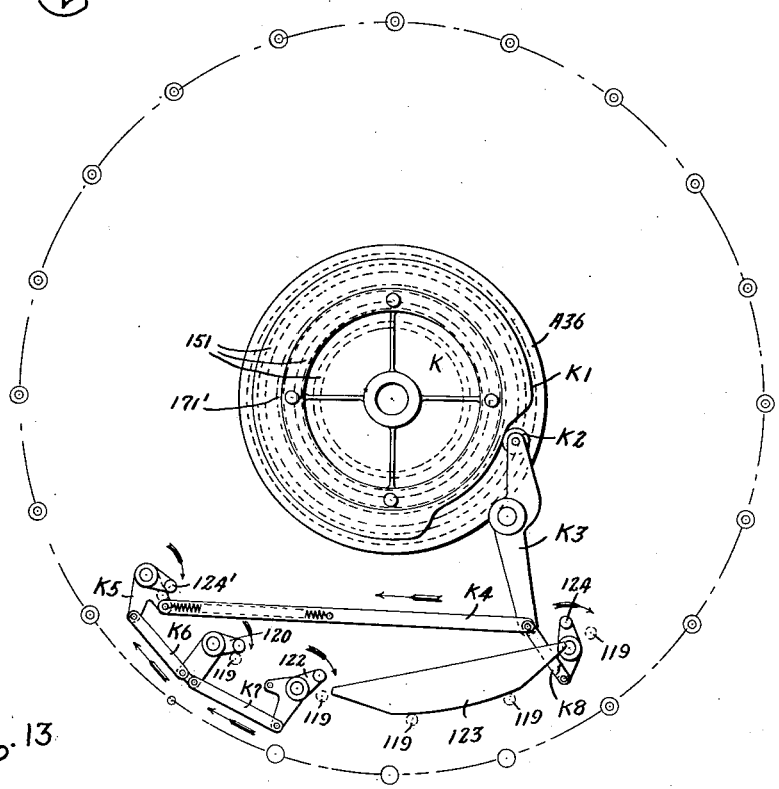
Fig. 13
Fig. 14
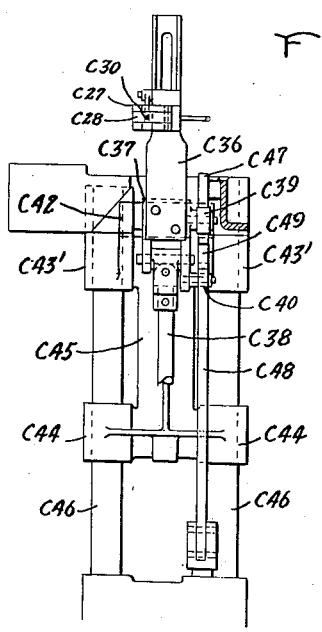
Fig. 15
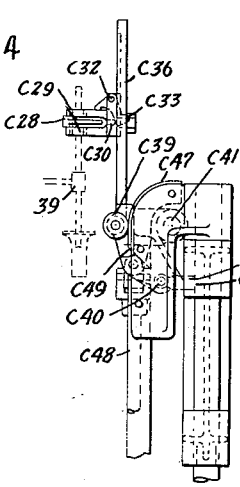
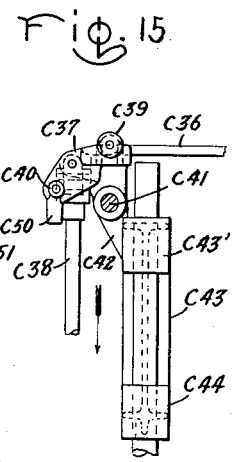
INVENTORS.
JOHN T. FAGAN,
LUDWIG STAUDENMEIR,
BY
THEIR ATTORNEY.

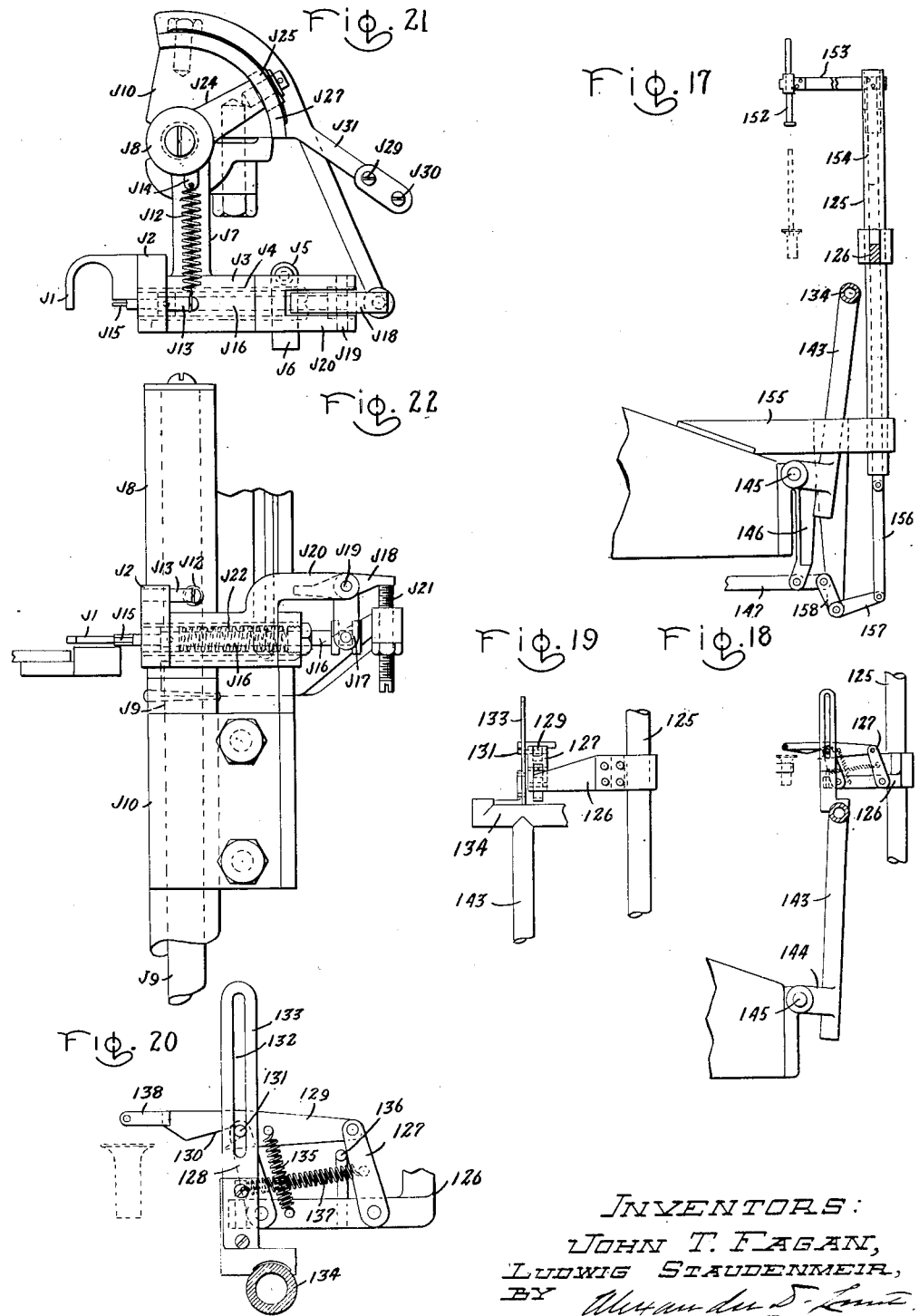

Patented Jan. 3, 1928.

1,655,141

UNITED STATES PATENT OFFICE.

JOHN T. FAGAN AND LUDWIG STAUDENMEIR, OF CLEVELAND, OHIO, ASSIGNORS TO GENERAL ELECTRIC COMPANY, A CORPORATION OF NEW YORK.

STEM-MAKING MACHINE.

Application filed October 9, 1923. Serial No. 667,584.

Our invention relates to apparatus for assembling and uniting glass articles and, more particularly, to apparatus for making glass stems for electric incandescent lamps and for other electrical devices comprising sealed containers. Our invention is particularly adapted to the manufacture of stems such as are disclosed in Mitchell and White Patent, 1,423,956, of July 25, 1922. The principal object of said invention is to dispense with hand labor to a greater degree than heretofore. Except for the feeding of the leading-in wires, in the preferred form, the operations are all accomplished automatically. Various other features and advantages will appear from the description which follows of a species thereof.

Figure 9:
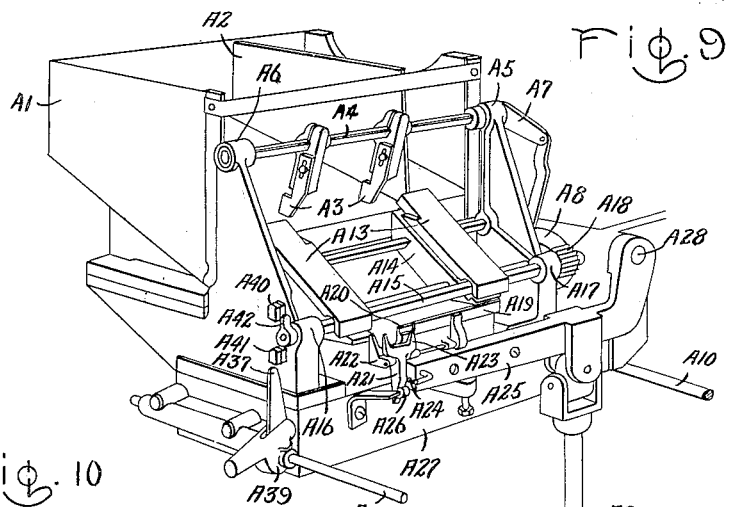
Figure 10:
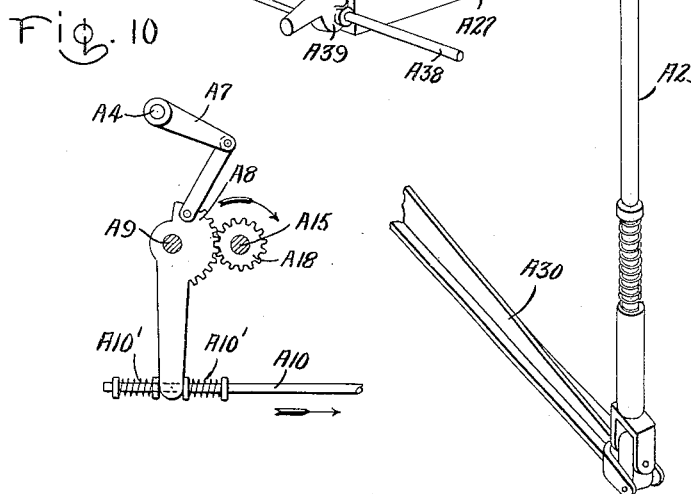
Figure 12:
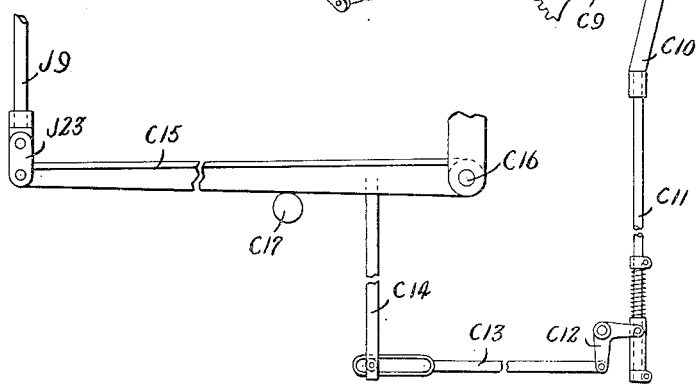

Fig. 1 is a plan view of the machine partially in section; Fig. 2 is an elevation partially in section; Fig. 3 is a fragmentary elevation partially in section showing one of the heads on an enlarged scale; Fig. 4 is a top plan view of the exhaust tube chuck; Fig. 5 is a horizontal section on the line 5—5 of Fig. 3 showing the flare chuck; Fig. 6 is a similar view on the line 6—6 showing the leading-in wire locating chuck; Fig. 7 is a similar view on the line 7—7 showing the cane or arbor chuck; Fig. 8 is a similar view on the line 8—8 showing the tube holders for the leading-in wires; Fig. 9 is a perspective of the cane feed mechanism; Fig. 10 is an elevation of a detail thereof; Fig. 11 is a perspective of the exhaust tube feed mechanism; Fig. 12 is an elevation of a detail thereof; Fig. 13 is a front elevation of the exhaust tube transfer mechanism forming part of the feed, and Figs. 14 and 15 are side elevations thereof; Fig. 16 is an elevation of the cane gauge; Fig. 17 is an elevation of the exhaust tube gauge; Figs. 18 and 19 are side and end elevations respectively of the flare gauge; Fig. 20 is an enlarged elevation of a detail thereof; Fig. 21 is a plan of the unloading mechanism; Fig. 22 is a front elevation thereof; Fig. 23 is a plan view with part of the machine broken away to show the cam and operating levers for the various chuck actuating pins; Fig. 24 is a rear elevation showing the seal clamping mechanism; and Fig. 25 is an elevation showing the means for blowing the aperture through the stem and also a completed stem.

The machine comprises a number of heads, there being twenty in the specific machine illustrated in the drawing. Each head is adapted to receive the parts necessary for making a stem which in the case of tipless stems consists of a flare tube, an exhaust tube, a piece of cane glass, and the two leading-in conductors. Each head comprises separate chucks for successively receiving these various parts. After a head has received all of the necessary parts and they have been properly positioned, it continues to advance intermittently around the machine and encounters various agencies which cause the fusion together of portions of the assembled parts, the clamping of the fused portion to form a seal, and the blowing of a passage through the clamped portion communicating with the exhaust tube. At suitable stages, heat is applied to anneal the glass to prevent strains and, therefore to diminish shrinkage which, in practice, is very low. After the completion of the stem it is discharged from the head.

The machine is of the same general type as that disclosed in Fagan application Serial No. 399,801, filed July 29, 1920. As shown in Fig. 2, spiders 1 and 2 which support the various heads are mounted on a central shaft 10 supported by bearings carried by table 11. The said shaft is driven by the horizontally disposed gear wheel 12 which forms part of a Geneva driving mechanism being engaged by the roller 13 eccentrically mounted between plates 14 on shaft 15. This carries on the lower end thereof a pinion 16 which is engaged by the gear wheel 17 mounted on the shaft 18 which is driven through the worm gear 19—20 from an outside source through the pulley 21. The cam plate K which comprises cams actuating various mechanisms is carried by the shafts 18.

As shown in Fig. 2, the parts of the head shown at the left are supported upon the aligned arms 22 and 23 of the respective spiders 1 and 2. The upper spider 1 is vertically adjustable with reference to the lower spider 2 so as to accommodate various sizes of stems, such adjustment being secured by screw 24 which works in shaft 10 and has a handwheel 25. A locater pin 27 extending upwardly from the arm 23 passes through a sleeve 28 on the arm 22 and insures proper alignment of head sections when the machine is assembled. The upper arm 22 carries the exhaust tube chuck 29 and the leading-in wire guides 30. The lower arm 23 carries the remaining chucks, namely the flare chuck 31, the leading-in wire locating chuck 32, the cane glass chuck 33 and the tubular holders 34 for the leading-in wires. The arm 23 has a bracket 35 at its outer end to receive the chuck actuating parts. Mounted in a bearing 36 in the lower member of said bracket is a shaft 37 which is circular in horizontal cross section for that portion thereof which extends through the lower arm 23 and has an upper portion 38, passing through the end of arm 22, which is square in horizontal cross section and carries thereon the means for actuating the exhaust tube chuck 29.

The exhaust tube chuck, as shown in Fig. 4, comprises jaws 39 and 40, the latter being adjustable. These jaws are carried by levers 41 and 42 respectively which are pivoted at 43 and 44 on a block 44' carried by arm 22. Supported on the square shaft end 38 and rotatable in a bearing in the end of arm 22 is a crank 45 which has pivoted thereto the links 46—47, also pivoted at their opposite ends respectively to the levers 41—42. The levers 41—42 are horizontally disposed and work in guide slots 41', 42', in the vertically disposed plate 42" attached to the end of the arm 22. A turning of the crank 45 in the direction of the arrow as shown in Fig. 4 serves to separate the jaws 39—40 to receive the exhaust tube. Such separation is against the action of a spring 48 attached to lug 49 extending from crank 45 and to a lug 50 extending from the bearing block 44' on the next head.

The leading-in wire supports or guides 51—52 are clamped at 53 to a lever 54 which is carried at the lower end of pin 55 extending through block 44'. Said pin carries at its upper end a bell-crank 57, one end of which has attached thereto a spring 58 attached to a pin 55 of the next head. The opposite end of said crank has a lug 59 which is so disposed as to be engaged by the lever 41 when the latter is moved a sufficient distance outwardly and to be moved therewith. This causes the lever 54 and the leading-in wire supports 51—52 to be moved so as to prevent the interference of the latter with the removal of the completed stem. An adjustable stop 60 comprising the screw 61 which is threaded in a lug 62 extending from the arm 22 is provided to position or align the leading-in wire supports when they swing back into operative position.

The flare tube chuck comprises a pair of jaws 63—64, the latter of which carries the adjustable contact 65. In view of the fact that this portion of the apparatus is subjected to heat, cooling fins 66 are provided. The jaws 63—64 are detachably mounted on levers 67—68 respectively which are pivotally mounted at their inner ends on shaft 69 extending between the upper and lower members of the bracket 35. The lever arms 67—68 have pivoted thereto the links 70—71 also pivoted at their other ends to crank 72 which is loosely sleeved on the shaft 37. Keyed to the said shaft and just below the plate 72 is a cam plate 73 having a lug 74 which is adapted to contact with a pin 75 extending downwardly from the crank 72 when the shaft 37 has been sufficiently rotated. A spring 76 extends between lug 77 on the crank 72 and pin 78 on the next head. The lever arms 67—68 are horizontally disposed and work in guide slots 79—80 in the vertically disposed plate 81 which is attached to the arm 23.

The leading-in wire locating chuck 32 comprises jaws 82—83 for definitely positioning those portions of the leading-in wires which are to be sealed into the stem. Lugs 82' and 83' on the said jaws are engaged by the bottom of the flare. The jaw 82 is shaped so as to provide grooves 84—85 to receive the leading-in wires and the other jaw, 83, clamps the leading-in wires against the upper plain portion of the jaw 82 thus definitely positioning them. The said jaws are detachably mounted on levers 86—87 which work in slots in the plate 81, and are horizontally disposed. They are connected by links 88—89 to the crank 90 loosely sleeved on the shaft 37 similarly to the crank 72. A plate 91 similar to 73 and having a lug 92 is keyed on the shaft 37 and when the latter is sufficiently rotated said lug engages a pin 93 extending downwardly from the crank 90 and causes an opening of the jaws 82—83 against the action of spring 94 extending between a lug 95 on the crank 90 and a pin 96 extending from the next head.

The cane glass or arbor chuck 33, as shown in Fig. 7, comprises the jaws 97—98, the latter of which carries the adjustable contact 99. The said jaws 97—98 are detachably mounted on levers 100—101 which are horizontally disposed and work in slots in plate 81. The said levers are connected by links 102—103 to a crank 104 which is loosely sleeved on the shaft 37. A plate 105 having lug 106 is keyed to said shaft and when said shaft is sufficiently turned said lug engages a pin 107 extending downwardly from the crank 104. This serves to open jaws 97—98 against the action of spring 108 which extends between the lug 109 on the crank 104 and a pin 110 extending from the next head.

As shown in Fig. 8, the leading-in wire holder tubes 34 are two in number and are adapted to receive the lower ends of the leading-in wires and to definitely locate them vertically. One of the holder tubes is detachably mounted at 111 on a bracket 112 and the said bracket carries the adjustable stop 113 which contacts with the other tube support which is stationary and detachably supported at 112' on the bracket 115. The bracket 112 is keyed to a shaft 114 extending through bracket 115 and carrying at its lower end the lug 116. The latter is adapted to contact with a stop 117 shown in Fig. 1 and this causes the tube holder mounted on the bracket 112 to be swung out so that it will not interfere with the insertion of the cane glass. A spring 118 serves to return the holder tube to its original position after such insertion.

The various chucks are opened by rocker arms which engage the roller 119 carried by an extension 119' on the bottom of shaft 37 and which are actuated by cam K (Figs. 1 and 23). The arm 120 opens the cane chuck and the others as well and the arm 122 opens the flare chuck and the leading-in wire locater but its throw is not sufficient to open the cane chuck. The stationary cam plate 123 opens and keeps open, for a convenient interval, the leading-in wire locating chuck. The arm 124 opens the exhaust tube chuck only. Finally the arm 124' opens all of the chucks for the discharge of the tube. As shown in Fig. 23, the cam track K1 on cam K actuates the rocker arms through roller K2 on crank K3 and links K4, K5, K6, K7 and K8.

Means are provided for automatically feeding to their respective chucks, the cane glass, the flare tube, and the exhaust tube, the leading-in wires being fed by hand. In the drawing, Fig. 1, the cane feed mechanism is indicated as A, the flare feed mechanism as B, and the exhaust tube feed mechanism as C.

The cane feed mechanism is illustrated in detail in Figs. 9 and 10. This mechanism consists of a hopper A1 which has a movable partition A2 whose position is determined by the length of cane to be fed. Agitator arms A3 are mounted on a shaft A4 which is turned in bearings A5—A6 by a crank A7 pivotally attached to a quadrant A8. The said quadrant is mounted on a shaft A9 and is oscillated by a lever A10. The latter is connected to a bell-crank A11 which is connected by link A12 to rocker arm 122. The agitator arms A3 allow room for only a single layer of cane to roll between the guide-ways A13, the latter being provided with slots A14 for receiving the ends of the glass rods. At the bottom of the guide track is mounted a carrier shaft A15 which is slotted to receive the cane one at a time. The said shaft is mounted in bearings A16—A17 and has mounted on the end thereof a pinion A18 which meshes with the quadrant gear A8 which as hereinbefore described is actuated with agitator mechanism from the rocker arm 122. And at each oscillation the carrier shaft is turned to discharge a length of cane into a holder comprising two jaws A19—A20, the latter being cut away along the top to form a recess. A strap A21 is pivoted in a fork A22 carried by the jaw A20 and has a forked end A23 which engages the cane glass and holds it firmly, by reason of the spring A24 which is attached to the opposite end of the strap and to the bracket A25 which carries the aforesaid jaws. A roller A26 is mounted on the frame A27 and is engaged by the end of strap A21 when the jaws are in the loading position, as shown in Fig. 9, and serves to open the said strap so that the cane glass may be received. The bracket A25 is periodically swung from the horizontal position to a vertical position being pivoted at A28 on the frame A27, and during this time the cane is securely clamped by the strap A21. The bracket A25 is oscillated from the horizontal to the vertical position by the rod A29 which is pivoted to a lever A30 which is keyed to a shaft A31 (Fig. 1) mounted in bearings A32—A33 and is actuated through a crank A34 having roller A35 engaging a cam track A36 on the cam K driven by the main drive shaft 18.

The arrangement of parts and timing of operation is such that when the cane glass is held in the vertical position in the jaws A19—A20 the said cane glass is engaged by the closing jaws 97—98 of the cane glass chuck previously opened and when the bracket A25 swings back toward the horizontal, the cane is removed. The position of the jaws 97—98 is such that they engage the cane glass through the fork of the strap A21.

The jaws 97—98 are separated at the proper instant by the engagement of the roller 119 carried on the bottom of shaft 37 by an arm 120. This causes a turning of the shaft 37 and consequent engagement of the lug 106 with the pin 107 to open up the cane chuck. It is true also as the lugs 74 and 92 are closer to their respective contact pins 75 and 93 than is the lug 106 to the pin 107 that the flare chuck and the leading-in wire locating chuck are also opened at this position, although this is merely incidental. It is true also that the exhaust tube chuck opens with the other chucks which is also merely incidental. Just before the cane is fed into the chuck, one of the holder tubes 34 is moved out of line by reason of the fact that the lug 116 contacts with a stationary pin 117. As soon as the cane feeding position is passed the tube 34 is pulled back into proper alignment by the action of the spring 118.

The feeding of the cane glass can be stopped by means of an arm A37 which is mounted on a shaft A38 held in suitable bearings on a bracket A39 which may be actuated by a hand wheel not shown. Ordinarily the carrier shaft A15 is limited in its movements by the stops A40—A41 which are engaged by a lug A42 mounted on the end of said carrier shaft and cushioned by means of the springs A10' carried by the rod A10 (Fig. 10). When the arm A37 is swung into operative position, the lug A42 encounters it and diminishes the amount of turn of the carrier shaft sufficiently to prevent the dumping or discharge of the cane glass.

The cane glass rod is definitely positioned vertically by a reciprocating plunger A43 (Fig. 16) carried by a cross piece and rod A44 which projects up through the bed of the machine and works through a sleeve therein. Attached to the lower end of the rod A44 is a link A45 which connects the same to a lever A46 fulcrumed at A47 and oscillated upwardly and downwardly through the lever arm A48 carrying roller A49 engaging cam A50. The latter is attached to the drive shaft 15. The end of the gauge rod A43 engages the bottom of the cane which is yieldingly held by the cane chuck and moves the same longitudinally to a definite position.

The flare feed mechanism B is of the type disclosed in Fagan and Rippl application, Serial No. 589,249, filed September 19, 1922, Patent No. 1,536,833, May 5, 1925, and more particularly the modified form disclosed in Figs. 7 and 8 of the drawing of that application. Said mechanism comprises a runway B1 into which the flares are fed as disclosed in the aforesaid application by the oscillating segment B2 which is actuated by the lever B3 keyed to the shaft A31 which carries the cane feeding mechanism so that the two work together. The result is that when a line of flare tubes is fed into the runway B1, an escapement lever B4 passes through a slot in the side of the runway and serves to hold back a line of tubes while the last flare B5 which is supported by the hooked end B6 of the runway which engages the flanges thereof is removed by the jaws 63—64 of the flare tube chuck. The said escapement arm is mounted on a crank B7 which is actuated by a lever A12 which also causes the quadrant lever A10 to oscillate.

The flare chuck jaws are opened by reason of the movement of the rocker arm 122 which engages the roller 119. This occasions the turning of the shaft 37 but not sufficiently to open the chuck which still grips the cane glass. After the rocker arm 122 is passed the flare chuck jaws close upon the flare and hold it in position.

The operator is stationed at X and feeds the leading-in wires. The roller 119 strikes the cam plate 123 and opens up the jaws 82—83. This allows the two leading-in wires to be inserted through the flare tube and down between the said jaws 82—83 with their ends extending into the leading-in wire tube holders 34 and resting against the stops in said tube holders. The upper ends of the leading-in wires are bent over the guides 30. After the roller 119 has passed the cam plate 123, the jaws 82—83 close upon the leading-in wires and securely hold them in position.

The next operation is feeding of the exhaust tube. The jaws 39—40 (Fig. 4) are opened by the movement of the rocker arm 124 against the roller 119, said movement being sufficient to open the exhaust tube chuck but none of the others. The exhaust tube feed mechanism is shown in Figs. 11 to 15 inclusive. It comprises a hopper C1 which is provided with an agitator comprising arms C2 which are mounted on a shaft C3 mounted in bearings C4—C5 and oscillated by a crank C6 pivotally attached to the link C7 which carries the quadrant C8. The link C7 is pivoted at C9 and has attached at one end thereof the link C10. The latter is raised and lowered through rod C11, attached thereto, by the crank C12 and links C13 and C14 which are connected to an arm C15. The latter is pivoted at C16 to a bracket fastened to the bed of the machine and is carried up and down by means of the lever C17 attached thereto, said lever being keyed to shaft C18 mounted in suitable bearings and actuated through a crank C19 having a roller C20 which works in the cam slot C21 (Fig. 2) of the cam K. The quadrant gear C8 engages a pinion C22 which is mounted on the end of the slotted feed roller C23 to which the exhaust tubes are fed one at a time when they roll down a track C24 from the hopper. As the feed roller C23 oscillates, it transfers one tube at a time to an exhaust tube transfer mechanism shown in Figs. 11, 13, 14 and 15. The tube rolls down the inclines C25—C26 and is received between jaws C27—C28, the latter being movable and pivoted between supports C29. A movable pin C30 engages the jaw C28 when it is in the horizontal position as shown in Fig. 11, and moves it to open position by reason of the striking of the lower end of said pin by an arm C31 pivoted at C32 and having a projection C33 which engages a stop C34 as the jaws swing into the receiving position. As the tube is carried from the horizontal to the vertical position, the jaw C28 closes firmly thereon by reason of the action of the spring C35. The said parts are mounted on an arm C36. The latter is rigidly attached to a crank C37. The opposite end of the crank is forked to receive the end of the actuating rod C38 which is pivoted thereto. The crank C37 carries two rollers C39—C40 and the said crank is pivoted on a shaft C41 which extends between ears C42 on the movable bracket C43 which comprises vertically extending sleeves C43' and C44 connected by a web C45.

Through said sleeves extend the stationary rods C46. The roller C39 rides on a track C47, the upper portion of which is curved and the lower portion, C48, of which is straight and extends vertically. As the rod C38 travels downwardly the arm C36 passes from the horizontal position shown in Fig. 15 to the vertical position shown in Fig. 14. During this movement the roller C39 travels over the curved portion of the track C47 and the roller C40 passes through a slot C49 in the track and afterwards contacts with the opposite side of the said track. The lug C50 extending from the crank C37 comes in contact with a stationary stop C51 when the arm C36 is in vertical position. The continued downward movement of the rod C38 causes the movable bracket C43 to be reciprocated downwardly on the rods C46 carrying with it the attached parts, the roller C39 contacting with one side of the track C48 and the roller C40 with the other. This causes the exhaust tube to be carried downward through the jaws 39—40 of the exhaust tube chuck and through the flare tube to bring the lower end of the exhaust tube practically into alignment with the lower end of the flare tube. The operation of the machine is so timed that when this position is reached, the jaws 39—40 close firmly on the exhaust tube and retain it in this position. When the rod C38 is raised the jaws C27—C28 slide over the exhaust tube to a position slightly beyond the upper end of the same, and then these jaws are swung with the arm C36 back to a horizontal position to receive another tube. The rod C38 is actuated by the lever arm C52 which is mounted on a shaft C53 actuated by an arm C54 having on the end thereof a roller C55 which rides in the cam slot C21 of the cam K.

All of the parts having now been assembled, the next operation is to definitely position the flare tube. This is accomplished by a gauge which is shown in Figs. 18, 19 and 20. A portion of the said gauge is mounted on the standard 125 which is attached to the bed of the machine. This portion comprises the bracket 126 to which are pivoted the links 127—128. A gauge arm 129 is pivoted at one end to the link 127 and has its lower surface slotted at 130 within which slot rides the pin 131 of the other link 128. The said pin extends also through a slot 132 in an arm 133 which is mounted on the manifold 134. A spring 135 serves to keep the arm 129 in contact with the pin 131. Considering now Fig. 20, as the gas pipe is swung to the right, the parts are raised to the position shown, and a continued movement to the right causes the links 127—128 to rotate about their pivots against the action of spring 137, thus taking the gauge out of the path of travel of the machine. On the return movement the link 127 contacts with the stop 136, this movement being assisted by the action of the spring 137. Thereafter the continued movement to the left causes the depression of the link 128 and the pin 131, which allows the gauge end 138 to contact with the top of the flare tube and forces the same gradually down through the flare chuck jaws to its proper position in contact with the stops 82'—83' on the leading-in wire locating chuck jaws. The spring 135 serves to cushion the impact of the gauge 138 against the flare tube.

It is necessary to swing the fires out of alignment of the path of travel of the stem parts during the period of indexing. Heat is applied to the region in which the ends of the flare, exhaust tube, cane glass and leading-in wires come together so as to form a fused glass mass uniting all of these parts. When a given stem has been indexed around to the position marked Z in Fig. 1, the fused mass is clamped. At a number of stations before reaching this point, heat is applied to gradually bring the glass up to the desired plasticity and after the station Z has been passed, heat is applied to maintain such plasticity until the aperture is blown through the clamped portion. In the drawing there are a number of pairs of gas burners 141 shown. These are arranged in pairs with the burners of each pair oppositely faced. Each pair of burners is connected to a manifold 134. As shown in Fig. 2, each manifold connects to a vertical pipe 142 to which the gas mixture is supplied from a suitable source. Each of the said pipes is carried in a casing 143 having a lug 144 by means of which it is mounted on a horizontally extending shaft 145. Each such shaft 145 carries three of the pipes 142 and said shaft is actuated by a crank 146 connected by link 147 to a bell crank 148 fulcrumed at 149 and the other end of which carries a roller 150. Each of said rollers rides on cam tracks 151, three of these being shown in Fig. 2, as two of the sets of burners are controlled by one of said tracks.

Following the positioning of the flare tube, the next step is to definitely position the exhaust tube. This is accomplished by a gauge having a contacting member 152 shaped to strike the top of the exhaust tube and force the same downward. The said member is adjustably carried in an arm 153 carried by a vertical extending rod 154 and working in a vertical slot in the tubular standard 125 which is supported by a bracket 155 mounted on the stationary bed of the machine. The rod 154 is reciprocated as the fires swing in and out of the path of travel of the stem parts, the lower end of said rod being connected by links 156—157 and 158 to an extension on one of the links 147 which is connected also to the crank 146 hereinbefore described.

The clamping, which takes place at station Z, is secured by means of flat jaws 159 each of which is attached by a web 160 to a sleeve 161 on a shaft 162. Each of the said shafts is actuated by cranks 163 to which are attached the links 164 pivotally connected to a block 165 carried by a rod 166 which reciprocates in a bearing in the lug 144 of the gas pipe casing hereinbefore described. Rod 166 has connected to the lower end thereof a pin 167 having a ball and socket joint with a crank arm 168 mounted on a shaft 169 which, as shown in Fig. 1, carries at its opposite end an arm 170 having roller 171 which rides in the cam slot 171' of the cam K. The parts are so proportioned and timed that the clamping operation takes place after the glass has become suitably plastic.

The next operation is to blow the aperture through the clamped plastic mass connecting with the exhaust tube in the manner described in Mitchell and White Patents, 1,423,956 and 1,423,957, July 25, 1922, and the Fagan application hereinbefore referred to. As shown in Fig. 25, a jet 173 directs air into the top of the exhaust tube and a jet 174 may also be used to direct a cooling blast into the stem tube. Two sets of these jets may be utilized, one being located at 175 and one at 176. Burners are located at these stations so that heat may be applied to the portion in which the aperture is blown. In practice it is preferred to apply such heat to the stem at the upper part of the clamped portion.

The unloading of the completed stems takes place at position J. The unloading mechanism is shown in Figs. 1, 2, 21 and 22. When the head is indexed to position J, the completed stem is engaged just below the flange on the flare tube by the hook J1. The latter extends from a head J2 which is journaled in a bearing J3 by means of a hollow shaft J4 which extends therethrough which carries at the opposite end a block J5 having extending from there the lug J6. The bearing J3 is supported by an arm J7 which is integral with an upright cylindrical member J8. The latter is fastened to a rod J9 which is slidably mounted in a bearing J10 supported by a bracket J11 on the stationary bed of the machine. A spring J12 extends between a lug J13 on the head J2 and a lug J14 on the member J8. A holding pin J15 which in the receiving position is retracted as shown in Fig. 21, is attached to a rod J16 which extends through the bearing J3 and at its opposite end has pivotally attached thereto the link J17 which forms part of a lever J18 fulcrumed at J19 in the forked extension J20 of the bearing block J3. The outer end of said lever J18 is adapted to contact with an adjustable stop J21 when the stem holder reaches its lowermost or receiving position and this serves to retract the rod J16 and the pin J15. A spring J22 surrounding said rod J16 is compressed upon the retraction of said rod. Upon the upward movement of the stem holder when the stop J21 no longer operates, said spring causes the pin J15 to advance so as to retain the stem in the holder. The upward movement of the holder to remove the stem is accomplished by the raising of the rod J9. The raising and lowering of said rod J9 is accomplished by the rocking of the arm C15 which actuates the delivery of the exhaust tubes to the exhaust tube transfer mechanism, the rod J9 being connected to the arm C15 by the link J23. The cylindrical member J8 has extending therefrom an arm J24 carrying a roller J25 which works in a cam slot J26 in a plate J27 which is fastened to the stationary member J10. This slot is of such shape that as the holder travels upwardly it is turned so as to swing the stem outwardly over a discharge chute J28 (Fig. 1). A pair of pins J29 and J30 project downwardly from an arm J31 extending from the plate J27. When the holder has reached the uppermost position with the stem over the discharge chute, the pin J29 engages the inner end of the lever J18 causing the pin J15 to be retracted and the pin J30 engages the lug J6 causing the holder J1 to be rotated somewhat in the direction of the discharge chute so that the stem will slide into the discharge chute. Upon the descent of the holder the parts return to their normal positions on account of the springs J12 and J22.

What we claim as new and desire to secure by Letters Patent of the United States, is:—

1. In a stem machine, the combination of a head comprising a chuck for receiving and supporting a stem tube and a chuck for receiving and supporting a rod or tube in predetermined relation to said stem tube, intermittently operating means for uniting said parts, means for causing the opening and closing of said chucks and intermediate mechanism for automatically causing said opening and closing to be in proper time relation with the operation of said uniting means.

2. In a stem machine, the combination of a head comprising a chuck for receiving and supporting a stem tube and a chuck for receiving and supporting a rod or tube in predetermined relation to said stem tube, means for feeding said stem parts to said chucks, means for causing the opening and closing of said chucks and intermediate mechanism for automatically causing said opening and closing to be in proper time relation with the operation of said uniting means.

3. In a stem machine, the combination of a movable table, a head mounted thereon comprising a plurality of chucks for receiving various stem parts, means for moving said table, means for opening said chucks to receive said parts, intermediate mechanism for automatically causing said opening means to operate in proper time relation with the movement of said table, and means disposed in the path of travel of said head to unite said parts.

4. In a stem machine, the combination of a movable table, a head mounted thereon comprising a plurality of chucks for receiving various stem parts, means for moving said table, means for feeding various stem parts at various points in the travel of said head, means for opening said chucks to receive said parts, means whereby said opening means is caused to operate in proper time relation with the movement of said table, and means disposed in the path of travel of said head to unite said parts.

5. In a stem machine, the combination of a movable table, a head mounted thereon comprising a plurality of chucks for receiving various stem parts, means for moving said table, means for feeding various stem parts at various points in the travel of said head, means for opening said chucks to receive said parts, means whereby said opening means is caused to operate in proper time relation with the movement of said table, means disposed in the path of travel of said head to unite said parts, and automatic means for removing the completed stems from said machine.

6. In a stem machine, the combination of a head comprising a flare tube chuck and a chuck for supporting an exhaust tube within said flare tube, intermittently operating means for uniting said parts, and intermediate mechanism for automatically opening and closing said chucks in a predetermined sequence and in proper time relation with the operation of said uniting means.

7. In a stem machine, the combination of a head comprising a flare tube chuck and a chuck for supporting an exhaust tube within said flare tube, automatic means for feeding said tubes to said chucks, and automatic means for opening said chucks to receive said tubes.

8. In a stem machine, the combination of a movable table, a head mounted thereon comprising a flare tube chuck and an exhaust tube chuck, means for moving said table, means for opening said chucks to receive said tubes, intermediate mechanism whereby said opening means is automatically caused to operate in proper time relation with the movement of said table, and means disposed in the path of travel of said head to unite said tubes.

9. In a stem machine, the combination of a movable table, a head mounted thereon comprising a flare tube chuck and an exhaust tube chuck, automatic means for feeding said tubes to said chucks, automatic means for opening said chucks to receive said tubes, and means disposed in the path of travel of said head to unite said tubes.

10. In a stem machine, the combination of a movable table, a head mounted thereon comprising a flare tube chuck and an exhaust tube chuck, automatic means for feeding said tubes to said chucks, automatic means for opening said chucks to receive said tubes, means disposed in the path of travel of said head to unite said tubes and automatic means for removing the completed stems from said machine.

11. In a stem machine, the combination of a head comprising a flare tube chuck, an exhaust tube chuck and an arbor chuck, intermittently operating means for uniting said parts, and intermediate mechanism for automatically opening said chucks in a predetermined sequence and in proper time relation with the operation of said uniting means.

12. In a stem machine, the combination of a head comprising a flare tube chuck, an exhaust tube chuck and an arbor chuck, automatic means for feeding said parts to said chucks, and automatic means for opening said chucks to receive said parts.

13. In a stem machine, the combination of a movable table, a head mounted thereon comprising a flare tube chuck, an exhaust tube chuck and an arbor chuck, means for moving said table, intermediate mechanism for automatically opening said chucks in proper time relation to the movement of said table to receive said parts, and means disposed in the path of travel of said head to unite said parts.

14. In a stem machine, the combination of a movable table, a head mounted thereon comprising a flare tube chuck, an exhaust tube chuck, and an arbor chuck, automatic means for feeding said parts to said chucks, automatic means for opening said chucks to receive said parts, and means disposed in the path of travel of said head to unite said parts.

15. In a stem machine, the combination of a movable table, a head mounted thereon comprising a flare tube chuck, an exhaust tube chuck, and an arbor chuck, automatic means for feeding said parts to said chucks, automatic means for opening said chucks to receive said parts, means disposed in the path of travel of said head to unite said parts and automatic means for removing the completed stems from said machine.

16. In a stem machine, the combination of a movable table, a head mounted thereon comprising a flare tube chuck and an exhaust tube chuck, means for moving said table, means for feeding said tubes to said chucks, means for opening said chucks to receive said tubes, means for adjusting the position of said flare tube in its chuck, means whereby said opening and adjusting means are caused to operate in proper time relation with the movement of said table, and means disposed in the path of travel of said head to unite said tubes.

17. In a stem machine, the combination of a movable table, a head mounted thereon comprising a flare tube chuck and an exhaust tube chuck, means for moving said table, means for feeding said tubes to said chucks, means for opening said chucks to receive said tubes, means for adjusting the position of said exhaust tube in its chuck, means whereby said opening and adjusting means are caused to operate in proper time relation with the movement of said table, and means disposed in the path of travel of said head to unite said tubes.

18. In a stem machine, the combination of a movable table, a head mounted thereon comprising a flare tube chuck and an exhaust tube chuck, means for moving said table, means for feeding said tubes to said chucks, means for opening said chucks to receive said tubes, means for adjusting the positions of said flare tube and exhaust tube in their respective chucks, means whereby said opening and adjusting means are caused to operate in proper time relation with the movement of said table, and means disposed in the path of travel of said head to unite said tubes.

19. A feeding device for glass rods or tubes comprising a hopper, an inclined discharge passage leading therefrom, an oscillating feed roller located at the bottom of said passage and shaped to receive one rod or tube at a time, transfer jaws disposed to receive each of said rods or tubes in a horizontal position, means for thereafter turning said jaws to cause said rod or tube to assume a vertical position, and means for causing all of said means to operate in predetermined time relation.

20. A mechanism for feeding to a machine glass rods or tubes comprising a hopper, an escapement for delivering rods or tubes one at a time from said hopper in a substantially horizontal position, means for receiving said rods or tubes so delivered and positioning them in a substantially vertical position to be received by said machine and means whereby all of said means are caused to operate in proper time relation with said machine.

21. A mechanism for feeding to a machine glass rods or tubes comprising a hopper, means for allowing said rods or tubes to be discharged one by one from said hopper, a transfer means positioned to receive said rods or tubes, means for causing said transfer means to thereafter assume a substantially vertical position with said rod or tube in position to be received by said machine and means for causing all of the aforesaid means to operate in proper time relation with said machine.

22. In a machine for consolidating a stem tube and exhaust tube to form a stem, the combination of a head for receiving said parts, means for feeding a stem tube thereto, means for thereafter feeding an exhaust tube thereto comprising a hopper, means for causing tubes to be discharged one by one from said hopper, a transfer means mounted to receive each of said tubes, means for thereafter positioning said transfer means so that said exhaust tube assumes a substantially vertical position over said stem tube, and means for then causing said exhaust tube to be lowered into said stem tube and to be then released to said head.

23. In a machine for consolidating a stem tube and exhaust tube, the combination of a head for receiving said parts, means for progressively moving said head, means for feeding a stem tube to said head, means for feeding an exhaust tube to said head so that it projects into said stem tube and means for actuating all of the aforesaid means in proper time relation.

24. In a machine for consolidating a stem tube, an exhaust tube and a support rod, the combination of a head for receiving said parts, means for progressively moving said head, means for feeding said stem tube and said support rod to said head with the former positioned over the latter, means for feeding an exhaust tube to said head so that it projects into said stem tube and means for actuating all of the aforesaid means in proper time relation.

25. In a machine for consolidating a stem tube and exhaust tube, the combination of a head for receiving said parts and supporting them in substantially vertical position, means for progressively moving said head, means for feeding a stem tube to said head, means for feeding an exhaust tube to said head so that it projects into said stem tube and means for actuating all of the aforesaid means in proper time relation.

26. In a machine for consolidating a stem tube, an exhaust tube and a support rod, the combination of a head for receiving said parts and supporting them in substantially vertical position, means for progressively moving said head, means for feeding said stem tube and said support rod to said head with the former positioned over the latter, means for feeding an exhaust tube to said head so that it projects into said stem tube and means for actuating all of the aforesaid means in proper time relation.

In witness whereof, we have hereunto set our hands this 6th day of October, 1923.

JOHN T. FAGAN.
LUDWIG STAUDENMEIR.